Sept. 6, 1966
O. W. MANDELL
3,270,369
RECIPROCATING SAW
Filed Oct. 2, 1964
2 Sheets-Sheet 1
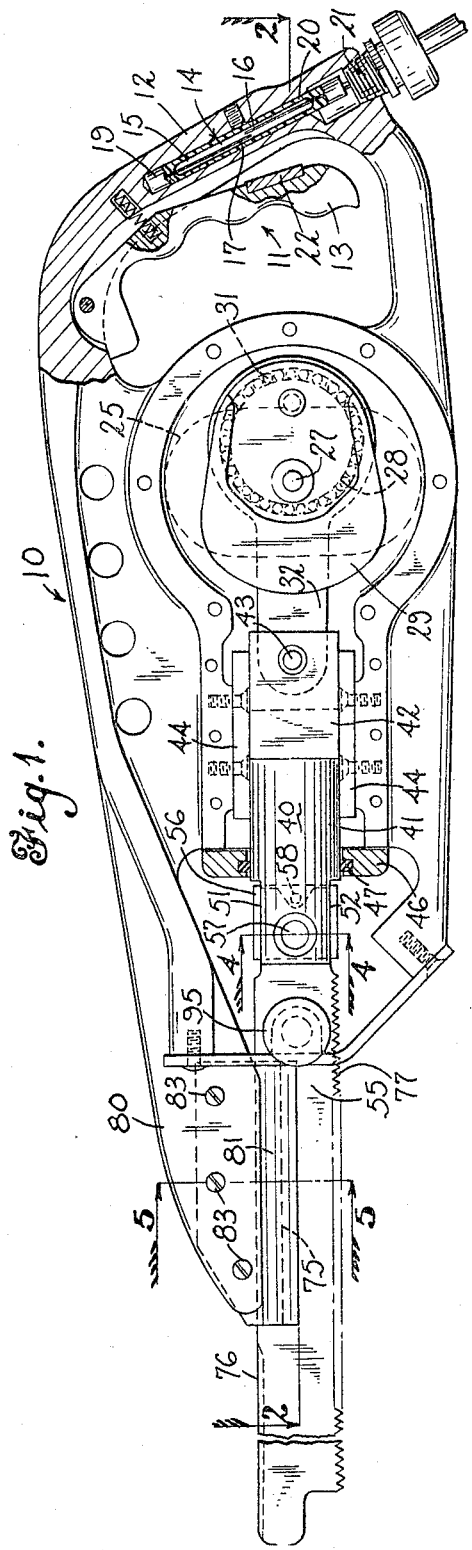
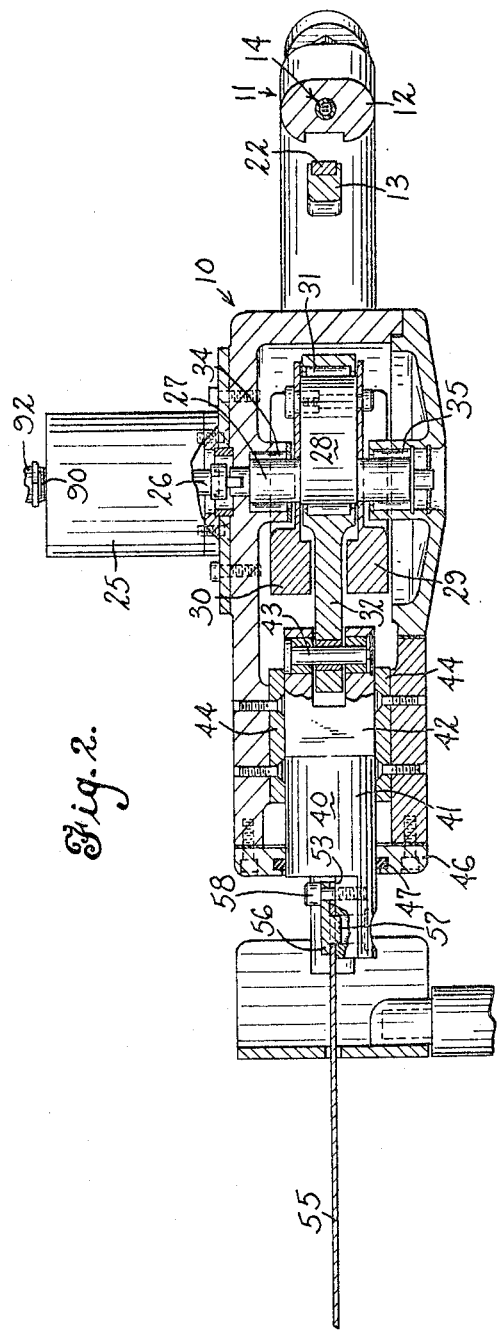
INVENTOR
Orville W. Mandell
BY
De Lio and Montgomery
ATTORNEYS

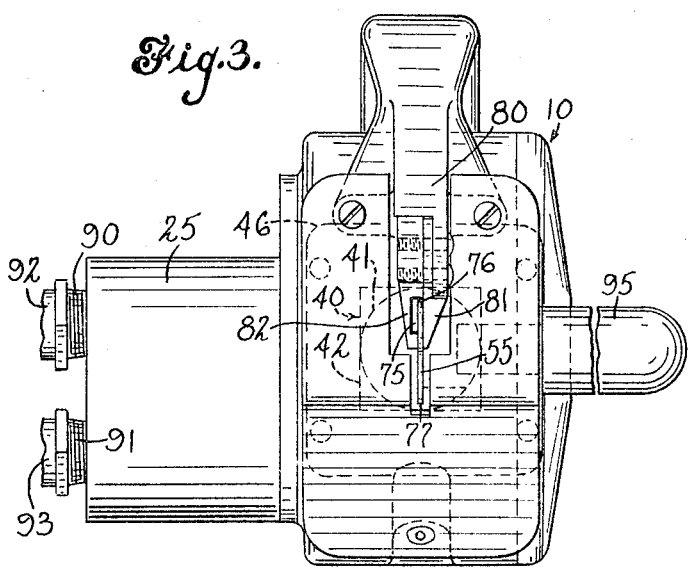
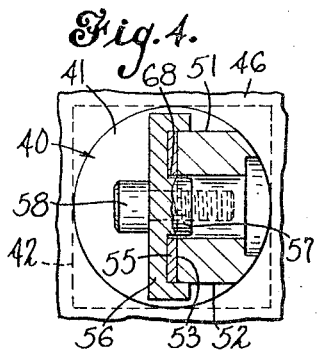
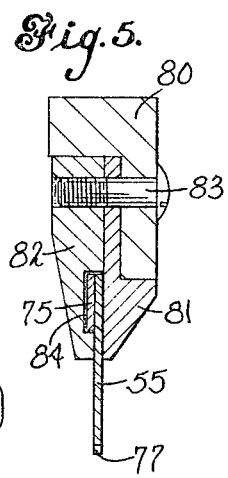
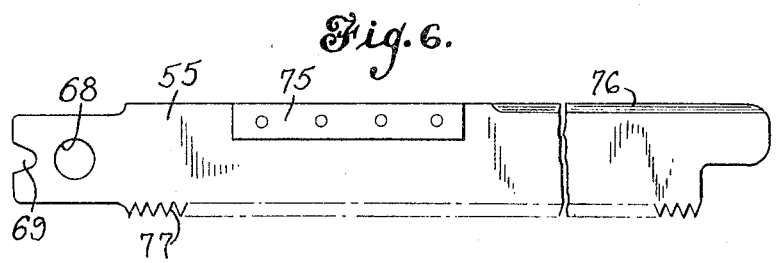
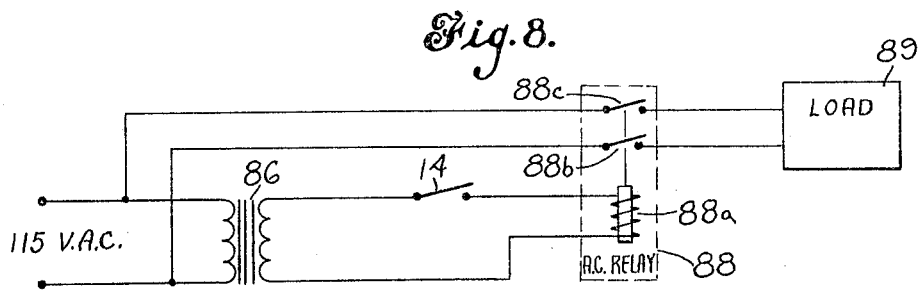
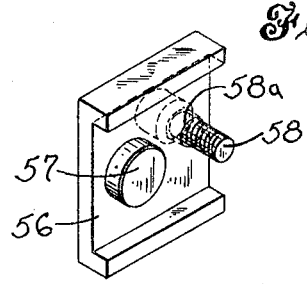

United States Patent Office 3,270,369
Patented Sept. 6, 1966

3,270,369
RECIPROCATING SAW
Orville William Mandell, Clinton, Conn., assignor to Jarvis Corporation, Guilford, Conn., a corporation of Connecticut
Filed Oct. 2, 1964, Ser. No. 401,075
9 Claims. (Cl. 17—23)

This invention relates to a reciprocating saw and, more particularly to a reciprocating saw which is capable of high speed reciprocation and which is particularly suitable for use in the meat industry.

The meat industry has, over the years, utilized scribe saws, bow saws, reciprocating saws and other types in processing and slaughtering operations. The reciprocating saw has been found to provide particular advantages when used for cutting the brisket, forequarter and hindquarter portions of a slaughtered animal.

The conventional reciprocating saws of the prior art have suffered from major disadvantages as, for example, reliability and short lifetimes. The short lifetime problem has generally resulted from the high stresses encountered by the various couplings and bearings during the operation of the saw. Further, reciprocating saws have been difficult to sterilize after a cutting operation without interfering with the internal saw mechanism because of insufficient sealing of the movable portion of the saw. Additionally, the prior art saws have connected the trigger switch usually employed in the handle of such saws directly in the high voltage circuit for driving the saw motor. This arrangement of the prior art is inherently dangerous especially in the meat industry, due to the environment in which the saw is used and, as such, the operator is subjected to high voltage shocks while holding the saw handle and operating the switch.

In view of the foregoing, an object of this invention is to provide a new and improved saw which provides long mechanical life, is easily sterilized and which is at the same time powerful and lightweight.

Another object of the invention is to provide a reciprocating saw which utilizes low voltage switching to start the motor or source of energy providing power to the saw.

Still another object of the invention is to provide a reciprocating saw employing a new and improved pitman coupled ram, having a plurality of geometric shapes along its length, for reciprocation of the saw blade.

A further object of the invention is to provide a reciprocating saw blade having a bearing strip to allow the saw to be guided while cutting in upward and downward directions.

Still further objects of the invention will in part be obvious and will in part appear hereinafter.

The invention accordingly comprises the apparatus possessing the features, properties and relation of elements which will be exemplified in the apparatus hereinafter described and the scope of the invention will be indicated in the claims.

For a fuller understanding of the nature and objects of the invention, reference should be had to the following detailed description taken in connection with the accompanying drawings in which the same reference numerals designate like or corresponding parts in the several views, and in which FIG. 1 is a side elevational view having external protective portions removed to show the internal operating mechanism and partially in section to show the holding and switching mechanism of the reciprocating saw, according to the invention;

FIG. 2 is a sectional view taken along line 2—2 of FIG. 1;

FIG. 3 is a front elevational view of the saw according to the invention;

FIG. 4 is an enlarged sectional view taken on line 4—4 of FIG. 1;

FIG. 5 is a sectional view taken along line 5—5 of FIG. 1;

FIG. 6 is a side view of a saw blade according to the invention;

FIG. 7 is an isometric representation of a clamp shown in FIG. 4; and

FIG. 8 is a schematic diagram of a circuit for applying power to a load or motor according to the invention.

Referring now to FIG. 1, there is shown a housing generally indicated at 10, having a handle portion generally indicated at 11, made from a suitable material such as plastic, wood, aluminum, or the like. The handle portion 11 comprises a grip portion 12 and a trigger 13. Inserted within the grip portion 12 is a reed switch generally shown at 14. The reed switch preferably comprises a glass tube 15 having mounted therein metallic reed elements 16 and 17. The glass tube in turn is inserted in a metal tube 19 and is separated from the metal tube at its sides by a plastic filler or a suitable filling compound 20. A plug 21 having two lead wires has one of its wires connected to metallic tube 19 and the other of its wires coupled to metallic reed element 16. One end of element 17 is connected to tube 19 to complete the circuit. To operate the switch, the operator squeezes the trigger 13 on the grip and a permanent magnet 22 attached to trigger 13 causes the two metallic reed elements 16 and 17 to contact one another to energize the saw motor.

Referring now to FIGS. 1 through 5, a hydraulic motor or source of power is shown at 25. This power source may comprise either a rotor or gear type structure. Further, other sources of power, such as electric motors, may be utilized but in the preferred embodiment a hydraulic motor is used.

Extending from the hydraulic motor 25 is a drive shaft 26 which is connected to a coupling shaft or crankshaft 27. The crankshaft 27 has an eccentric portion 28 upon which is connected two counterweights 29 and 30 as shown. These counterweights are connected in such a manner as to pivot around the crankshaft 27. A pitman or connecting rod 32 is coupled to the eccentric portion 28 of the shaft 27 through roller bearings 31. The shaft 27 rides within the roller bearings 34 and 35 which are mounted in the housing 10 as shown.

Upon rotation of the drive shaft 26, shaft 27 rotates in such a manner that the pitman or connecting rod 32 moves toward the left and then toward the right while the counterweights revolve in an opposite direction so as to maintain a balance in the mechanism and thereby reduce vibration in the saw.

The pitman or connecting rod 32 is coupled to a ram 40 which is provided at its forward end with a round or cylindrical portion 41 and at its rearward end with a rectangular portion 42. The connecting rod 32 is coupled to the ram 40 by a pin 43. The ram 40 slides or reciprocates within the housing 10 and is guided in its movement by a plurality of guides 44. The guides cooperate with the rectangular portion of the ram, so that any twisting motion of the blade is substantially isolated from both the connecting rod 32 and the bearings 31, 34 and 35. As such, the guides and the ram coact in such a manner as to absorb the twisting motion. This substantially reduces the wear and tear on the bearings and results in longer life for the saw.

An end cap 46 is coupled to the housing 10 and has an opening therein for permitting the rounded end 41 of the ram 40 to move freely therethrough. The rounded end of the ram 41 is tightly sealed by cylindrical seal 47. Thus, by the use of a ram element having both rectangular and round portions, spurious mechanical forces are eliminated in the mechanism while providing an effective seal to prevent moisture from entering the working portion of the saw mechanism.

Referring now to FIGS. 2 and 4, the ram portion 41 is provided with a top flat 51, a bottom flat 52 and a side flat 53, which is preferably coincident with the longitudinal axis of the ram.

As shown in FIGS. 4 and 7, a saw blade 55 is held in a relatively fixed manner on the flat 53 by a clamping plate 56. The clamping plate fits over the top and bottom flats 51 and 52 and is provided with a pin 57 and an opening 58a to permit a screw 58 to pass therethrough. Pin 57 fits securely in a bore of the side flat 53 and the screw 58 is then tightened to further clamp the saw blade 55 in place.

Referring now to FIG. 6, the saw blade 55 is provided with a hole 68 which permits the pin 57 to pass therethrough. A cut-away or notched portion 69 is provided at the rear end of the saw blade 55 to permit the screw to rigidly hold the blade against the end portion of the ram. Accordingly, when the blade 55 is to be removed from the ram end portion, screw 58 is loosened to permit clamp 56 to move a sufficient distance from side flat 53 which, in turn, permits pin 57 to be removed from the bore opening in the ram. As such, the saw blade 55 can be removed and a new blade inserted in its place.

Referring again to FIG. 6, the saw blade 55 is provided with a bearing strip 75 which may be attached to either one or both sides of the blade. In the preferred embodiment, bearing strip 75 is attached to one side of the blade and may be spot-welded or affixed in any other suitable manner. The blade 55 is also provided with two cutting edges 76 and 77 so as to permit the saw to be used to cut in both upward or downward directions.

The housing 10 is provided with a nose portion 80 having two bearing strip support or guide elements 81 and 82 which are rigidly attached to the nose portion 80 by screws 83. The bearing support section 82 has a channel portion 84 for guiding the bearing strip 75 of blade 55. The bearing strip and the channel guide restrict the movement of the blade so that it can be used as a knife in upward cutting and as a saw in downward cutting. Furthermore, the blade is held securely in place, thus decreasing the stress placed upon both the pin 57 and screw 58. This saw blade and clamp obviates the necessity of utilizing four or more screws to hold the blade securely to the ram. As such, this configuration permits the blade to be easily removed without the necessity of removing a multitude of screw elements.

As shown in FIGS. 1 and 8, upon squeezing of the trigger element 13, reed elements 16 and 17 contact each other thereby closing switch 14. Power is then applied from a source, such as 115 volt A.C. wall outlet through a step-down transformer 86 to a solenoid 88a of an A.C. relay 88. Upon energization of solenoid 88a, relay contacts 88b and 88c close to energize the load such as a pump 89. The pump then forces fluid, such as oil, through an inlet hose 92 into an inlet fitting 90, as more clearly shown in FIG. 3. The pressure of the hydraulic fluid causes the hydraulic motor to rotate the shaft 26 of the motor. An outlet fitting 91 and outlet hose 93 are connected to the pump at the outlet side thereof. A handle 95 is provided at the forward end of the saw device to permit manipulation of the saw during the operating thereof.

Thus, a reciprocating saw is provided which is safer to use because of the high voltage isolation of the means for actuating the power unit. The saw is also capable of longer mechanical life since any twisting of the blade is substantially attenuated before its effect is felt by the bearings and the connecting rod of internal operating mechanism of the saw. The construction of the saw further provides for ease of sterilization after use while, at the same time, not interfering with the lubrication of the internal moving parts of the saw. Additionally, the construction of the saw nose and the blade used with the saw permits the saw to be used as a knife in the upward cutting direction and as a saw in the downward cutting direction.

It will thus be seen that the objective set forth above among those made apparent from the preceding description are efficiently attained and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A reciprocating saw mechanism for holding a saw blade having at one end a notch and a pin hole spaced apart from the cutting end of said blade, said saw blade having a bearing strip thereon, said mechanism comprising in combination, a housing having an interior portion and a front nose portion with a channel region therein for guiding said bearing strip, a driveshaft positioned in the interior of said housing, means for rotating said driveshaft, a connecting rod coupled to said driveshaft, a ram coupled to said connecting rod, the ram end closest to said connecting rod having a rectangular shape, the remainder of said ram having a cylindrical shape, a portion of which extends outside the interior of said housing, said cylindrical ram portion having an end portion for securing said saw blade thereto, a plurality of guides surrounding said rectangular ram end and positioned to prevent rotation of said ram, a cylindrically shaped seal surrounding the cylindrical portion of said ram, and means for securing said blade to said ram end portion.

2. A reciprocating saw comprising in combination, a housing, a driveshaft mounted in said housing, said shaft having an eccentric portion, a pitman coupled to said shaft, a counterweight coupled to said eccentric portion of said shaft, a ram having a rectangular portion coupled to said pitman and a round portion which extends outside from the interior of said housing, guide means in the interior of said housing for guiding said rectangular ram portion within said housing, an end plate coupled to said housing and having a seal therein for permitting said round ram portion to move in a reciprocating motion in and out of said housing, an end portion on said ram positioned on a portion of the ram external said housing, said ram end portion having at least one flat thereon, a nose portion of said housing, said nose portion having a channel region, a saw blade, said blade having a bearing strip thereon, and a clamp for attaching said blade to said flat so as to permit said bearing strip to lie in said channel region.

3. A reciprocating saw comprising in combination, a housing, a ram partially enclosed with said housing, means for driving said ram in a reciprocating motion, said housing having a nose portion with a channel therein, said channel having along the side thereof a guide slot, a saw blade coupled to an end of said ram at a point external said housing, and said blade having at least one bearing strip mounted thereon for sliding movement within said guide slot.

4. In a reciprocating saw, a housing, a ram at least partially enclosed within said housing, means for driving said ram in a reciprocating motion, said ram having a rectangular portion, and a round portion, said round portion extending forward of said rectangular portion and projecting partially from said housing and four flats positioned within said housing and forming guide means for preventing said rectangular portion from twisting during the use of said saw.

5. In a reciprocating saw mechanism for holding a saw blade comprising in combination, a housing, a crank shaft positioned within said housing, said shaft having an eccentric portion, and said shaft being supported by said housing and riding in a plurality of bearings positioned between said shaft and said housing, means for propelling said crank shaft, a pitman surrounding said eccentric portion and being spaced therefrom by a plurality of bearings, a counterweight means coupled to said shaft in a manner adapted to balance the rotation of the eccentric portion of said shaft, a ram coupled to said pitman, said ram having a rectangular-shaped portion and a round-shaped portion extending externally from said housing, said round-shaped end provided with a flatted end region for affixing a saw blade thereto, and flat guide means coupled within said housing and positioned about at least two sides of said rectangular-shaped portion.

6. The saw mechanism according to claim 5, wherein said housing includes a front nose portion having a channel therein for supporting a bearing strip coupled to said saw blade.

7. The saw mechanism according to claim 5, wherein said housing includes a handle comprising a grip and trigger means, a magnetic reed switch positioned within said housing and actuated by closing the trigger means on said grip, a source of high voltage, a low voltage transformer coupled between said source of high voltage and said reed switch, a relay having a solenoid coupled to said reed switch, said relay having its contacts coupled between said source of high voltage and said means for propelling.

8. A system according to claim 4, including a handle portion having a grip and trigger means, said grip means having inserted therein a magnetic reed switch, and said trigger means carrying a permanent magnet for actuating said switch upon closure of said trigger on said grip.

9. A system according to claim 8 including a motor for driving the ram, a source of high voltage, a step-down transformer coupled to said source, a relay having an actuating coil and contact means, said actuating coil and said reed switch coupled in circuit to said transformer, and pump means coupled to said motor, said pump means and said relay contact means coupled in circuit to said source.

References Cited by the Examiner
UNITED STATES PATENTS

| | | | |
|---|---|---|---|
| 1,726,863 | 9/1929 | Singer | 143—68 X |
| 2,139,147 | 12/1938 | Blum | 143—156 |
| 2,596,481 | 5/1952 | Hincks | 17—23 |
| 2,637,354 | 5/1953 | Davis. | |
| 2,747,622 | 5/1956 | Saye | 17—23 X |

SAMUEL KOREN, *Primary Examiner.*

LUCIE H. LAUDENSLAGER, *Examiner.*